United States Patent
Kim et al.

(10) Patent No.: US 11,579,619 B2
(45) Date of Patent: Feb. 14, 2023

(54) AUTONOMOUS DRIVING METHODS AND APPARATUSES

(71) Applicant: Samsung Electronics Co., Ltd., Suwon-si (KR)

(72) Inventors: Kyung-Rock Kim, Yongin-si (KR); Jun-Won Jang, Seoul (KR); Joon-Kee Cho, Yongin-si (KR); Taesin Ha, Seongnam-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 568 days.

(21) Appl. No.: 16/704,807

(22) Filed: Dec. 5, 2019

(65) Prior Publication Data
US 2020/0192392 A1    Jun. 18, 2020

(30) Foreign Application Priority Data
Dec. 18, 2018 (KR) .................. 10-2018-0164137

(51) Int. Cl.
*G05D 1/02* (2020.01)
*G06N 3/04* (2006.01)
(Continued)

(52) U.S. Cl.
CPC ......... *G05D 1/0221* (2013.01); *G05D 1/0088* (2013.01); *G06N 3/04* (2013.01); *G06N 3/08* (2013.01); *G05D 2201/0213* (2013.01)

(58) Field of Classification Search
CPC .............. G05D 1/0221; G05D 1/088; G05D 2201/0213; G05D 1/0217; G05D 1/0212;
(Continued)

(56) References Cited

U.S. PATENT DOCUMENTS 9,792,546 B2    10/2017 Passot et al.
2011/0021770 A1*    1/2011 Tang .................. A61P 37/04
536/123.1
(Continued)

FOREIGN PATENT DOCUMENTS

JP    3467487 B2    11/2003
JP    2016-0242572 A    1/2019
(Continued)

OTHER PUBLICATIONS

M. Kobilarov, G. Sukhatme, J. Hyams and P. Batavia, "People tracking and following with mobile robot using an omnidirectional camera and a laser," Proceedings 2006 IEEE International Conference on Robotics and Automation, 2006. ICRA 2006., 2006, pp. 557-562, doi: 10.1109/ROBOT.2006.1641769. date: May 2006.*
(Continued)

*Primary Examiner* — Marthe Y Marc-Coleman
(74) *Attorney, Agent, or Firm* — Harness, Dickey & Pierce, P.L.C.

(57) ABSTRACT

An autonomous driving apparatus for accompanied driving in an environment that includes a companion and an obstacle includes a sensor, processing circuitry, and a driver. The sensor may generate sensor data. The processing circuitry may define a current state of the autonomous driving apparatus based on processing the sensor data to determine respective positions of the companion and the obstacle in the environment and select a first tracking point of a plurality of tracking points at least partially surrounding the position of the companion in the environment based on the current state, a position of each tracking point of the plurality of tracking points in the environment defined by the position of the companion in the environment. The driving apparatus drive mechanism may move the autonomous driving apparatus to the first tracking point to cause the autonomous driving apparatus to accompany the companion in the environment.

23 Claims, 13 Drawing Sheets

(51) Int. Cl.
*G05D 1/00* (2006.01)
*G06N 3/08* (2006.01)

(58) Field of Classification Search
CPC .. G05D 1/12; G06N 3/04; G06N 3/08; G06N 3/006; G06N 3/0454; G06N 3/02
See application file for complete search history.

(56) References Cited

U.S. PATENT DOCUMENTS

| | | | |
|---|---|---|---|
| 2013/0342652 A1* | 12/2013 | Kikkeri | B25J 9/104 348/46 |
| 2014/0371912 A1 | 12/2014 | Passot et al. | |
| 2018/0085654 A1 | 3/2018 | Black et al. | |
| 2018/0181137 A1 | 6/2018 | Choi et al. | |
| 2019/0042859 A1* | 2/2019 | Schubert | G05D 1/0088 |
| 2020/0047342 A1* | 2/2020 | Lee | G05D 1/0214 |

FOREIGN PATENT DOCUMENTS

| | | |
|---|---|---|
| KR | 100935879 B1 | 1/2010 |
| KR | 10-2016-0049111 A | 5/2016 |
| KR | 101845398 B1 | 4/2018 |

OTHER PUBLICATIONS

Thibault Kruse et al., "Human-aware robot navigation: A survey", Robotics and Autonomous Systems 61 (2013) 1726-1743.

\* cited by examiner

User movement prediction

AUTONOMOUS DRIVING METHODS AND APPARATUSES

CROSS-REFERENCE TO RELATED APPLICATION

This application claims under 35 U.S.C. § 119 to Korean Patent Application No. 10-2018-0164137, filed on Dec. 18, 2018, in the Korean Intellectual Property Office, the entire contents of which are incorporated herein by reference in their entirety.

BACKGROUND

1. Field

Example embodiments relate to autonomous driving methods and apparatuses for track a person and, more particularly, to methods and apparatuses for tracking a person and moving together when the person moves.

2. Description of the Related Art

In recent years, there has been a growing interest in mobile robots moving with people in an environment where people coexist with robots, and various service robots are currently being developed to provide human-aware travelling services in a real environment. In related arts, local movement strategies to be implemented by robots to cause the robots to move in an environment, suitable for individual cases, are suggested based on a method of implementing a new rule and a movement strategy by navigation experts with regard to a new service, an environment, and a robot.

Various attempts have been made to solve various problems occurring during driving with people.

SUMMARY

Some example embodiments relate to an autonomous driving method for accompanied driving, including driving by an autonomous vehicle in an environment, including driving by the autonomous vehicle relation to a separate person in the environment.

Some example embodiments relate to an autonomous driving method that is an integrated method that can implemented by an autonomous vehicle to solve problems occurring in various situations in a comprehensive manner, while presenting local movement strategies to be implemented by the autonomous vehicle to cause the autonomous vehicle to move through an environment in individual cases. Such an autonomous driving method may be implemented with reduced, minimized, or prevented occurrence of repetitive cause similar movement errors and may provide a continuous improvement in movement performance of the autonomous vehicle.

According to some example embodiments, an autonomous driving method for accompanied driving by an autonomous driving apparatus in an environment that includes a companion and an obstacle may include defining a current state of the autonomous driving apparatus based on first information indicating a position of the companion in the environment and second information indicating a position of the obstacle in the environment. The first information and the second information may be based on processing sensor data generated by at least one sensor of the autonomous driving apparatus that monitors the environment. The autonomous driving method may include selecting a first tracking point of a plurality of tracking points at least partially surrounding the position of the companion in the environment based on the current state. A position of each tracking point of the plurality of tracking points in the environment may be defined by the position of the companion in the environment. The autonomous driving method may include causing the autonomous driving apparatus to move to the first tracking point to accompany the companion in the environment.

Defining the current state may include defining the current state based on third information indicating a position of a destination in the environment.

The selecting the first tracking point may include acquiring an output of an artificial neural network corresponding to the plurality of tracking points based on inputting fourth information indicating the current state to the artificial neural network such that the artificial neural network generates the output based on processing the fourth information, and selecting the first tracking point from the plurality of tracking points based on the output of the artificial neural network.

The artificial neural network may be configured to predict a reward for an episode associated with a movement of the autonomous driving apparatus to a particular tracking point of the plurality of tracking points in a particular state based on a first reward criterion associated with accompanied driving, a second reward criterion associated with collision avoidance, and a third reward criterion associated with energy optimization.

The artificial neural network may be configured to predict the reward further based on a fourth reward criterion associated with a determination of whether a distance of the autonomous driving apparatus from a destination decreases as a result of the movement to the particular tracking point.

The artificial neural network may be configured to predict a reward for each of a plurality of episodes generated through movement to separate, respective tracking points of the plurality of tracking points, such that each tracking point of the separate, respective tracking points corresponds to a separate reward of a set of rewards. The first tracking point may be selected based on a determination that the first tracking point corresponds to a greatest reward of the set of rewards.

The causing the autonomous driving apparatus to move to the first tracking point may include determining operation information associated with movement of the autonomous driving apparatus to the first tracking point, and controlling an operation of the autonomous driving apparatus to cause the autonomous driving apparatus to move to the first tracking point based on the determined operation information.

The determining the operation information includes determining a speed of the movement, and determining an angular velocity of the movement.

The artificial neural network may include a reinforcement-learning-based neural network.

The selecting the first tracking point may include determining a future tracking point of a plurality of future tracking points defined by the autonomous driving apparatus to at least partially surround a predicted future position of the companion in the environment based on predicting a movement of the companion.

According to some example embodiments, an autonomous driving learning method may include receiving information indicating a current state of an autonomous driving apparatus based on first information indicating a position of a companion in an environment and second information indicating a position of an obstacle in the environment. The first information and the second information may be generated based on processing sensor data generated by at least one sensor of the autonomous driving apparatus that monitors the environment. The autonomous driving learning method may include determining a prediction Q-value based on inputting the information indicating the current state to an artificial neural network to cause the artificial neural network to generate the prediction Q-value based on the input information indicating the current state. The autonomous driving learning method may include determining a tracking point of a plurality of tracking points at least partially surrounding the position of the companion in the environment based on the prediction Q-value, a position of each tracking point of the plurality of tracking points in the environment defined by the position of the companion in the environment. The autonomous driving learning method may include calculating a reward based on a new state of the autonomous driving apparatus at the determined tracking point, the new state associated with a new relative position of the autonomous driving apparatus in relation to the companion and the obstacle when the autonomous driving apparatus is at the determined tracking point. The autonomous driving learning method may include determining a target Q-value based on the reward. The autonomous driving learning method may include training the artificial neural network based on the target Q-value and the prediction Q-value.

The reward may be determined based on a first reward criterion associated with accompanied driving, a second reward criterion associated with collision avoidance, and a third reward criterion associated with energy optimization.

The autonomous driving learning method may further include repetitively determining the new state and the reward in a particular episode associated with a movement of the autonomous driving apparatus to a particular tracking point of the plurality of tracking points.

The determining the target Q-value may include determining, by a user, a particular target Q-value.

A non-transitory computer-readable storage device may store computer readable instructions that, when executed by processing circuitry, cause the processing circuitry to perform the autonomous driving method of claim 1.

According to some example embodiments, an autonomous driving apparatus configured to perform accompanied driving in an environment that includes a companion and an obstacle may include a sensor configured to generate sensor data based on monitoring the environment. The autonomous driving apparatus may include processing circuitry configured to define a current state of the autonomous driving apparatus based on processing the sensor data to determine a position of the companion in the environment and a position of the obstacle in the environment, and select a first tracking point of a plurality of tracking points at least partially surrounding the position of the companion in the environment based on the current state, a position of each tracking point of the plurality of tracking points in the environment defined by the position of the companion in the environment. The autonomous driving apparatus may include a driver configured to move the autonomous driving apparatus to the first tracking point to cause the autonomous driving apparatus to accompany the companion in the environment.

The processing circuitry may be configured to define the current state further based on information indicating a position of a destination in the environment.

The processing circuitry may be configured to acquire an output of an artificial neural network corresponding to the plurality of tracking points based on inputting information indicating the current state to the artificial neural network such that the artificial neural network generates the output based on processing the fourth information, and select the first tracking point from the plurality of tracking points based on the output of the artificial neural network.

The artificial neural network may be configured to predict a reward for an episode associated with a movement of the autonomous driving apparatus to a particular tracking point of the plurality of tracking points in a particular state based on a first reward criterion associated with accompanied driving, a second reward criterion associated with collision avoidance, and a third reward criterion associated with energy optimization.

The artificial neural network may be configured to predict the reward further based on a fourth reward criterion associated with a determination of whether a distance of the autonomous driving apparatus from a destination decreases as a result of the movement to the particular tracking point.

According to some example embodiments, an autonomous vehicle configured to perform accompanied driving in an environment that includes a companion may include a sensor configured to generate sensor data based on monitoring the environment. The autonomous vehicle may include processing circuitry configured to define a relative position of the autonomous vehicle based on processing the sensor data to determine a position of a companion in the environment, and select a first tracking point of a plurality of tracking points at least partially surrounding the position of the companion in the environment based on the relative position, a position of each tracking point of the plurality of tracking points in the environment defined by the position of the companion in the environment. The autonomous vehicle may include a driver configured to move the autonomous vehicle to the first tracking point to cause the autonomous vehicle to accompany the companion in the environment.

The environment may further include an obstacle that is separate from the companion, and the processing circuitry may be further configured to define the relative position of the autonomous vehicle based on processing the sensor data to determine a position of the obstacle in the environment.

The processing circuitry may be configured to define the relative position further based on information indicating a position of a destination in the environment.

The processing circuitry may be configured to acquire an output of an artificial neural network corresponding to the plurality of tracking points based on inputting information indicating the relative position to the artificial neural network such that the artificial neural network generates the output based on processing the fourth information, and select the first tracking point from the plurality of tracking points based on the output of the artificial neural network.

The artificial neural network may be configured to predict a reward for an episode associated with a movement of the autonomous vehicle to a particular tracking point of the plurality of tracking points in a particular state based on a first reward criterion associated with accompanied driving, a second reward criterion associated with collision avoidance, and a third reward criterion associated with energy optimization.

The artificial neural network may be configured to predict the reward further based on a fourth reward criterion associated with a determination of whether a distance of the autonomous vehicle from a destination decreases as a result of the movement to the particular tracking point.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
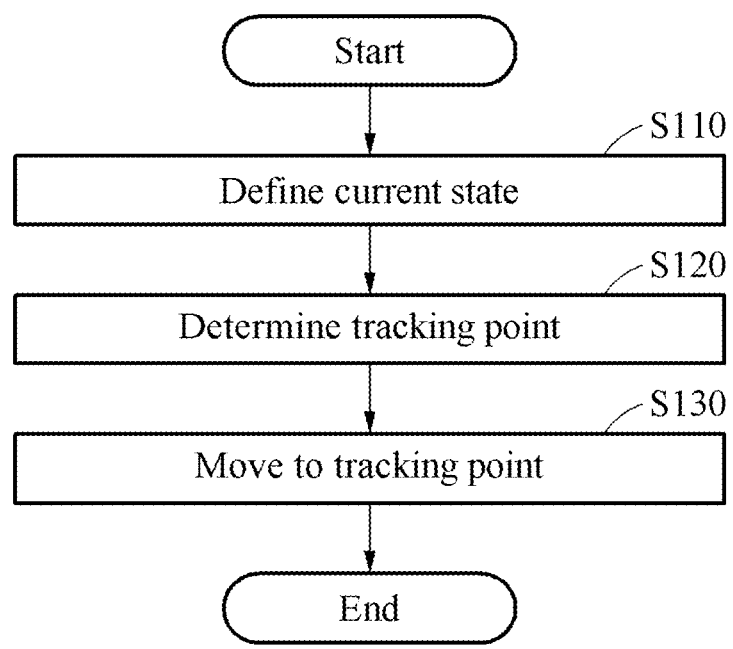
FIG. 1 is a flowchart illustrating an autonomous driving method for accompanied driving according to some example embodiments.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. In the description of some example embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

FIG. 1 is a flowchart illustrating an autonomous driving method for accompanied driving by an autonomous vehicle in an environment that includes a companion and an obstacle according to some example embodiments. The autonomous driving method may be implemented by the autonomous driving apparatus 300 illustrated in FIG. 3. As described herein, the autonomous driving apparatus 300 may be interchangeably referred to as an "autonomous vehicle."

It will be understood that "accompanied driving" may refer to moving ("driving") through an environment to accompany a particular object in the environment. The particular object that is to be accompanied via the accompanied driving may be referred to herein as a "companion" that is in the environment. In some example embodiments, the companion in the environment may be a particular human being. In some example embodiments, the companion in the environment may be a vehicle and/or driving apparatus that may be at least partially similar to the autonomous driving apparatus 300 implementing the accompanied driving with regard to the companion.

Referring to FIG. 1, an autonomous driving method for accompanied driving by an autonomous driving apparatus ("autonomous vehicle") may include the autonomous driving apparatus determining a positional relationship with a companion and set ("establish," "generate," or the like) a movement strategy to cause the autonomous driving apparatus to move in an environment to accompany the companion in the environment based on the determined positional relationship while travelling together with the companion.

The autonomous driving method for accompanied driving includes operation S110. In operation S110, the autonomous driving apparatus defines a current state of the autonomous driving apparatus based on information indicating a position of a companion in the environment ("first information") and information indicating a position of a nearby obstacle in the environment ("second information"). In some example embodiments, the first and second information may be generated based on processing sensor data generated by at least one sensor of the autonomous driving apparatus as a result of the at least one sensor monitoring the environment. Accordingly, in some example embodiments, operation S110 includes receiving sensor data from the at least one sensor of the autonomous driving apparatus, processing the sensor data to generate the first and second information, and defining the current state of the autonomous driving apparatus based on processing the first and second information. The current state of the autonomous driving apparatus may include information that indicates a relative position of the companion and the obstacle in the environment in relation to the autonomous driving apparatus, including distance, heading, bearing, or any combination thereof of each of the companion and the obstacle in relation to the autonomous driving apparatus.

The autonomous driving apparatus may be a performer ("autonomous vehicle") that is configured to perform autonomous driving based on the autonomous driving method for accompanied driving to accompany the companion in the environment. For example, the autonomous driving apparatus may be a mobile robot equipped with means of mobility. Such means of mobility, as described herein, may include one or more vehicle drive mechanisms, also referred to as drivers. Example embodiments of the autonomous driving apparatus are not limited to the foregoing example and may be variously modified according to the design intention. For example, in some example embodiments, the autonomous driving apparatus may be an autonomous vehicle that is configured to accommodate one or more occupants, including one or more human occupants, in a cabin that may be partially or entirely internal to the autonomous vehicle, a cabin that is at least partially exposed to an exterior of the autonomous vehicle, some combination thereof or the like. In some example embodiments, the autonomous vehicle may be an autonomous car, a car configured to be manually driven under control of a human occupant and further configured to implement at least partial autonomous driving, or any combination thereof.

In some example embodiments, the autonomous driving apparatus may be an aircraft that is configured to move through the air without resting upon a hard surface (e.g., "fly"). For example, in some example embodiments, the driver of the autonomous driving apparatus may be configured to generate thrust to cause the autonomous driving apparatus to achieve and/or maintain powered flight. Such an autonomous driving apparatus may perform accompanied driving in an environment by flying through the environment.

In view of the above, it will be understood that "accompanied driving," "driving," or the like as described herein is not limited to movement of the autonomous driving apparatus on a hard surface such that the structural load ("weight") of the autonomous driving apparatus is directly transmitted to the hard surface, but may further encompass movement of the autonomous driving apparatus on and/or in a body of liquid (e.g., movement, or "sailing" as the term is well-known, through a body of water), movement of the autonomous driving apparatus through a an atmosphere (e.g., air) without contacting a hard surface (e.g., flight, as the term is well-known, including aerodynamic (powered or unpowered) flight, buoyant flight, and/or ballistic flight).

The accompanied driving may indicate that a robot and a companion move together within a predetermined distance. The accompanied driving will be described in detail with reference to FIGS. 4 through 6.

An object tracked by the autonomous driving apparatus may be referred to as a companion. For example, the companion may be a target person of the autonomous driving apparatus. The autonomous driving apparatus may designate a particular object (e.g., person) in a surrounding environment based on sensing the object via sensor data generated by a sensor of the autonomous driving apparatus, processing the sensor data to identify the presence of the object in the environment, and identifying the identified object as a companion of the autonomous driving vehicle (e.g., based on comparing a captured image of the object with a reference image of the companion to identify the object as the companion based on determining that the captured image matches the reference image within at least a threshold confidence level, such as 90% confidence), based on processing a signal received from the object and/or a device attached to or worn by the object, based on two-way communication between the autonomous driving apparatus and the object to recognize the object as a companion, some combination thereof, or the like. The companion may also be multiple target people of the autonomous driving apparatus. It will be understood that the companion may be any target human, animal, and/or vehicle that may be identified and tracked by the autonomous driving apparatus. For example, the companion may be another vehicle that has structure similar or identical to the structure of the autonomous driving apparatus.

A current state, also referred to herein as a current state of the autonomous driving apparatus, may be indicated and/or defined by information on ("associated with," "indicating," or the like) a position between the autonomous driving apparatus and each of the companion and the nearby obstacle (e.g., distance therebetween, angle and/or azimuth between a reference vector of the autonomous driving apparatus and the companion and/or obstacle). Such information may be referred to as, and/or may include, ("first") information indicating a position of the companion in relation to the autonomous driving apparatus and ("second") information indicating a position of the obstacle in relation to the autonomous. The current state may be defined based on absolute positions of the autonomous driving apparatus, the companion, and the nearby obstacle; for example, the first and second information may indicate absolute positions of the companion and the nearby obstacle, respectively. In some example embodiments, the current state may be defined based on, and the first and second information may indicate, a relative position of the autonomous driving apparatus relative to positions of the companion and the nearby obstacle, respectively. The aforementioned information may be generated based on one or more portions of the autonomous driving apparatus processing sensor data generated by at least one sensor of the autonomous driving apparatus that monitors at least a portion of the environment in which the autonomous driving apparatus is located.

It will be understood that a nearby obstacle may refer to any object that is within a certain, threshold proximity to the autonomous driving apparatus in the environment and is further separate from the companion that is being tracked by the autonomous driving apparatus. For example, an object may be distinguished as being a "nearby" obstacle based on being sufficiently proximate to the autonomous driving apparatus to be detectable by the autonomous driving apparatus based on sensor data generated by one or more sensors of the autonomous driving apparatus. In some example embodiments, the threshold proximity may be a particular distance from the autonomous driving apparatus in the environment that is less than the maximum detection distance of the one or more sensors of the autonomous driving apparatus, such that an object that is detectable by the autonomous driving apparatus in the environment may not be a nearby obstacle if the object is further from the autonomous driving apparatus than the particular threshold distance. It will also be understood that an obstacle may be a fixed object in the environment (e.g., an inanimate object) or a mobile object in the environment (e.g., another person, animal, vehicle, or the like that is separate from the companion). In some example embodiments, an obstacle may be a lane marking on the surface on which the autonomous driving apparatus is located (e.g., a lane marking defining at least a portion of a road), and the autonomous driving apparatus may be configured to implement accompanied driving to accompany the companion in the environment while moving within a lane defined by one or more lane markings in the environment.

In view of the above, it will be understood that operation S110 may include defining a current state of the autonomous driving apparatus based on ("first") information indicating a position of a companion in the environment and second information indicating a position of an obstacle in the environment, where the first information and the second information are generated based on processing sensor data generated by at least one sensor of the autonomous driving apparatus that monitors the environment.

The autonomous driving method for accompanied driving may include operation S120. In operation S120, the autonomous driving apparatus determines (e.g., selects) a particular tracking point from a plurality of particular (or alternatively, predetermined) tracking points in the environment that at least partially surround the position of the companion in the environment, based on the determined current state of the autonomous driving apparatus. Restated, the autonomous driving apparatus may select a "first tracking point" from the plurality of tracking points. A position of each tracking point of the plurality of tracking points in the environment may be defined by the position of the companion in the environment (e.g., the absolute position of the companion in the environment). For example, the plurality of tracking points may be defined by the autonomous driving apparatus as points, in the environment, that partially or entirely surround the companion at a particular (e.g., fixed) distance from the companion in the environment and are spaced apart from each other (e.g., at fixed angular spacing's from each other) at least partially around the companion in the environment (e.g., evenly spaced apart at fixed angular intervals around a 180-degree arc that extends around a back end of a companion. It will be understood that each tracking point may be a reference point in the environment that is defined by the autonomous driving apparatus, based at least in part upon the position of the companion in the environment.

During the accompanied driving, relative positions between the companion and the autonomous driving apparatus may be changed based on a circumstance to ensure efficient and stable driving by the autonomous driving apparatus. While the companion is moving, the autonomous driving apparatus may need to move based on a positional relationship with the companion continuously changing, from moment to moment in consideration of a movement efficiency and a safety distance from an obstacle. The autonomous driving apparatus may revise and/or change its movement through the environment continuously (e.g., from moment to moment) based on the canorously changing of the positional relationship of the autonomous driving apparatus with the companion.

To move based on the positional relationship with the companion changing every moment (e.g., continuously changing), the autonomous driving apparatus may define candidate tracking points around the companion (e.g., at least partially surrounding the companion) in the environment based on the positional relationship with the companion and determine a most appropriate tracking point (e.g., the first tracking point) in a current situation. For example, the autonomous driving apparatus may determine (e.g., select) a first tracking point among a plurality of particular (or alternatively, predetermined) tracking points around (e.g., at least partially surrounding) a position of the companion. A method of determining a tracking point (e.g., selecting the first tracking point) will be described in detail with reference to FIGS. 7 through 10.

The autonomous driving method for accompanied driving may include operation S130. When the tracking point is determined (e.g., the first tracking point is selected), in operation S130, the autonomous driving apparatus is caused to move to the determined tracking point (e.g., move to the selected first tracking point) to accompany the companion in the environment (e.g., move in the environment so as to maintain at least a threshold proximity to the companion in the environment). Operation S130 may include an operation of determining operation information associated with a movement (e.g., movement of the autonomous driving apparatus to the first tracking point). Although the tracking point (e.g., the first tracking point) is set, the autonomous driving apparatus may move to the tracking point using various methods. For example, the operation information associated with the movement may include various contents. The operation information associated with the movement may include information indicating a moving speed of the autonomous driving apparatus associated with the movement of the autonomous driving apparatus to the first tracking point, information indicating an angular velocity of the autonomous driving apparatus associated with the movement of the autonomous driving apparatus to the first tracking point—or any combination thereof, and the determining of the operation information may include determining such information indicating the moving speed and/or angular velocity.

Operation S130 may include an operation of controlling an operation of the autonomous vehicle to cause the autonomous vehicle to move to the first tracking point based on the determined operation information. Such controlling may include controlling one or more drivers of the autonomous driving apparatus based on the operation information to cause the one or more drivers to induce controlled movement of the autonomous driving apparatus in the environment. The autonomous driving apparatus may move based on the determined ("first") tracking point and the operation information of the autonomous driving apparatus using means of mobility equipped therewith (e.g., the one or more drivers).

It will be understood that accompanied driving by an autonomous driving apparatus may be implemented in an environment that includes a companion but no nearby obstacle. Accordingly, in some example embodiments, a current state of the autonomous vehicle that is defined at S110 may be a relative position of the autonomous vehicle that is defined based on processing sensor data, generated by a sensor of the autonomous driving apparatus, to determine a position of a companion in the environment but without determining a position of any obstacle in the environment (e.g., the current state may be defined based solely on the first information and without consideration of any second information), and operations S120 and S130 may similarly be performed without consideration of a position of any obstacle in the environment. Additionally, it will be understood that any of the methods described herein with reference to any of the example embodiments may be performed with regard to a companion in an environment and without consideration of any obstacles that are separate from the companion in the environment.

Figure 2:
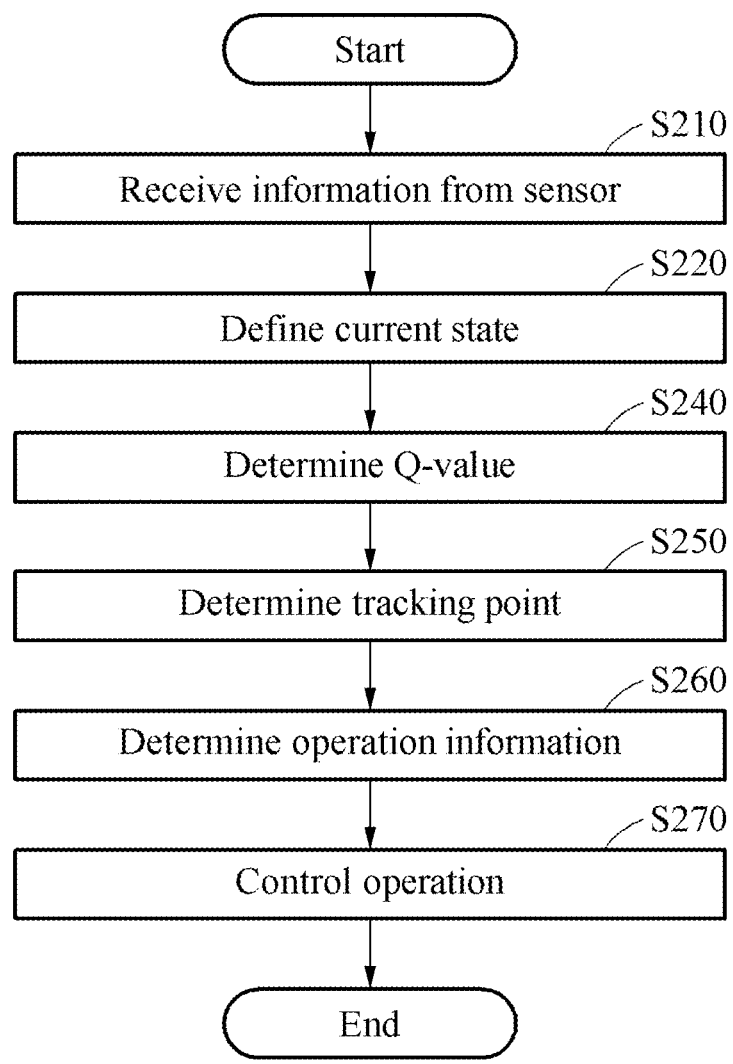
FIG. 2 is a flowchart illustrating an autonomous driving method for accompanied driving according to some example embodiments.

FIG. 2 is a flowchart illustrating an autonomous driving method for accompanied driving according to some example embodiments.

Referring to FIG. 2, operations S210 through S270 may be performed by an autonomous driving apparatus. The autonomous driving apparatus may be implemented by one or more hardware modules, one or more software modules, or various combinations thereof. The autonomous driving method of FIG. 2 may be implemented by the autonomous driving apparatus 300 illustrated in FIG. 3. As described herein, the autonomous driving apparatus 300 may be interchangeably referred to as an "autonomous vehicle."

In operation S210, the autonomous driving apparatus receives information indicating a current state of the autonomous driving apparatus based on first information indicating a position of a companion in the environment and second information indicating a position of an obstacle in the environment. The first information and the second information may be generated by the autonomous driving apparatus (e.g., by a processor thereof) based on processing sensor data generated by at least one sensor of the autonomous vehicle that monitors the environment (e.g., at least a portion of the environment). The sensor may include an image sensor. The image sensor may be, for example, a camera. The image sensor may be provided in (e.g., included in) the autonomous driving apparatus to be configured to acquire sensor data that may be processed to generate first information that indicates a position of a companion in the environment and second information that indicates a position of a nearby obstacle in the environment.

In operation S220, the autonomous driving apparatus defines a current state of the autonomous driving apparatus based on the information that is generated based on the sensor data received from the sensor. The current state may include information indicating a relative position between the autonomous driving apparatus and each of the companion and the nearby obstacle.

In operation S240, the autonomous driving apparatus determines a Q-value (e.g., prediction Q-value) corresponding to a plurality of tracking points based on the current state of the autonomous driving apparatus. To determine the Q-value, the autonomous driving apparatus may use an artificial neural network trained in advance. For example, the autonomous driving apparatus may input ("fourth") information associated with the current state (e.g., information defining the current state, information indicating the current state, or the like) to the artificial neural network to cause the artificial neural network to generate a Q-value output based on the input information associated with the current state. Accordingly, in operation S240, the autonomous driving apparatus may acquire a Q-value output by the artificial neural network in correspondence to the plurality of tracking points. The artificial neural network may include a reinforcement-learning-based neural network. For example, the artificial neural network may include a deep Q-network (DQN).

In operation S250, the autonomous driving apparatus determines a tracking point (e.g., the first tracking point) of the plurality of tracking points at least partially surrounding the position of the companion in the environment based on the Q-value. For example, the autonomous driving apparatus selects a tracking point from which a highest Q-value is output from the tracking points.

In operation S260, the autonomous driving apparatus determines operation information associated with a movement. For example, the autonomous driving apparatus determines a moving speed and/or an angular velocity associated with movement of the autonomous vehicle to the first tracking point.

In operation S270, the autonomous driving apparatus controls an operation of the autonomous driving apparatus to cause the autonomous driving apparatus to move to the first tracking point based on the determined operation information, and such controlling may cause the autonomous driving apparatus to move to the first tracking point to cause the autonomous driving apparatus to accompany a companion in the environment. For example, the autonomous driving apparatus may be caused to move to the first tracking point based on the determined ("first") tracking point and the operation information using means of mobility equipped therewith (e.g., a driver of the autonomous driving apparatus).

Figure 3:
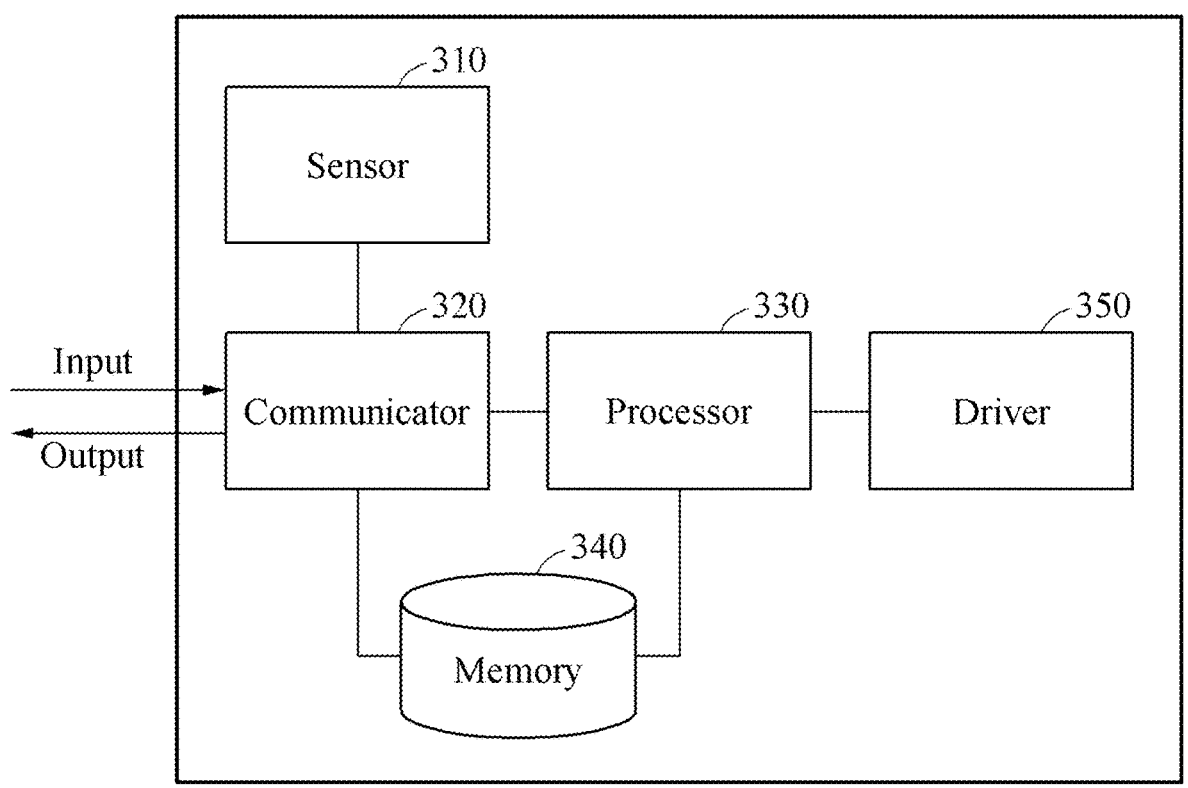
FIG. 3 is a block diagram illustrating an autonomous driving apparatus according to some example embodiments.

FIG. 3 is a block diagram illustrating an autonomous driving apparatus according to some example embodiments.

Referring to FIG. 3, an autonomous driving apparatus 300 includes a sensor 310, a processor 330, and a driver 350. The autonomous driving apparatus 300 may further include a communicator 320 and a memory 340.

The sensor 310 may be configured to generate sensor data based on monitoring an environment in which the autonomous driving apparatus is located. The sensor 310 may include an image sensor. The image sensor may be, for example, a depth camera. The image sensor may be provided in the autonomous driving apparatus and may generate sensor data that, when processed, provides information indicating a position of a companion in an environment. The sensor 310 may include a laser scanner. The laser scanner may be provided in the autonomous driving apparatus and may be configured to generate sensor data that, when processed, provides information indicating a position of a nearby obstacle in the environment.

The communicator 320 may be connected to the sensor 310, the processor 330, and the memory 340 to transmit and receive data. The communicator 320 may be connected to an external device to transmit and receive data. Hereinafter, transmitting and receiving "A" may represent transmitting and receiving "information or data that indicates A" and/or transmitting and receiving "information or data that, when processed at the autonomous driving apparatus, provides information or data that indicates A."

The communicator 320 may be configured as a circuitry within the autonomous driving apparatus 300. For example, the communicator 320 may include an internal bus and an external bus. As another example, the communicator 320 may refer to an element that connects the autonomous driving apparatus 300 and the external device. The communicator 320 may be an interface. The communicator 320 may receive data from the external device and transmit the data to the processor 330 and the memory 340.

The processor 330 may process data received by the communicator 320 and data stored in the memory 340. Here, the processor may be a data processing device, including one or more instances of processing circuitry such as hardware including logic circuits; a hardware/software combination such as a processor executing software; or a combination thereof having a physical structure configured to execute desired operations. The operations may include, for example, codes and instructions included in a program. The data processing device embodied by hardware may include, for example, a microprocessor, a central processing unit (CPU), a processor core, a multi-core processor, a multiprocessor, an application-specific integrated circuit (ASIC), and a field programmable gate array (FPGA).

The processor 330 may execute a computer-readable code, for example, software, stored in a memory, for example, the memory 340 and instructions caused by the processor 330.

The memory 340 may store data received by the communicator 320 and data processed by the processor 330. For example, the memory 340 may store the program. The stored program may be a set of syntaxes that are coded and executable by the processor 330.

The memory 340 may include, for example, at least one volatile memory, nonvolatile memory, random memory access (RAM), flash memory, a hard disk drive, and an optical disk drive.

The memory 340 may store an instruction set ("program of instructions"), for example, software, for operating the autonomous driving apparatus 300. The instruction set for operating the autonomous driving apparatus 300 may be executed by the processor 330.

The processor 330 may execute a program of instructions stored in the memory 340 to implement some or all of the functionality of the autonomous driving apparatus 300, including some or all of the methods described herein according to any of the example embodiments.

The autonomous driving apparatus 300 may include the driver 350 required to move to a tracking point. The driver 350 may include mechanical devices configured to move the autonomous driving apparatus 300. For example, the driver 350 may include a motor, and a torque output from the motor may be used to move the autonomous driving apparatus 300.

A driver may include a vehicle powertrain, as the term is well-known to refer to the main components that generate power and deliver it to the environment in which the autonomous driving apparatus (e.g., underlying surface on which the autonomous driving apparatus is resting, water, or air), such that the driver of an autonomous driving apparatus may include a prime mover (e.g., an electric motor, an engine, or the like), one or more final drives (e.g., one or more drive wheels, continuous tracks, propellers, impellers, or the like), and components configured to transmit power from the prime mover to the final drive (e.g., a transmission, drive shafts, differentials, or the like), such that the driver will also be understood to include a drivetrain as the term is well-known. It will be understood that a driver may not necessarily include all of the above components (e.g., may not include a transmission, differential, drive shaft, or the like); for example, a driver may comprise an electric motor that is directly (e.g., without any interposing components) connected to a final drive that is one or more wheels. The driver may include one or more steering mechanisms configured to adjust an orientation and/or trajectory of movement of the autonomous driving apparatus in the environment. It will be understood that a driver may include multiple prime movers (e.g., multiple motors) configured to operate separately or together and which may be coupled to, and configured to generate power that is delivered to, separate sets of one or more final drives. The driver may further include a battery, fuel supply system, or the like that is configured to supply the energy utilized by the prime mover to generate power. In some example embodiments, at least a portion of the functionality that may be implemented by the processor 330 of the autonomous driving apparatus 300 as described herein (e.g., operations that may be implemented by the processor 330 to control one or more elements of the driver) may be considered to be a part of the driver.

As described herein, the autonomous driving apparatus 300, in some example embodiments, may be configured to perform some operations by artificial intelligence and/or machine learning, including deep learning. As an example, the autonomous driving apparatus may include a processing circuit (e.g., processor 330) that may include an artificial neural network that is trained on a set of training data (e.g., learning data, learning frames, etc.) by, for example, a supervised, unsupervised, and/or reinforcement learning model, and wherein the processing circuit may process a feature vector to provide output based upon the training. Such artificial neural networks may utilize a variety of artificial neural network organizational and processing models, such as convolutional neural networks (CNN), deconvolutional neural networks, recurrent neural networks (RNN) optionally including long short-term memory (LSTM) units and/or gated recurrent units (GRU), stacked neural networks (SNN), state-space dynamic neural networks (SSDNN), deep belief networks (DBN), and/or restricted Boltzmann machines (RBM). Alternatively or additionally, the processing circuit may include other forms of artificial intelligence and/or machine learning, such as, for example, linear and/or logistic regression, statistical clustering, Bayesian classification, decision trees, dimensionality reduction such as principal component analysis, and expert systems; and/or combinations thereof, including ensembles such as random forests and generative adversarial networks (GANs).

The sensor 310, the communicator 320, the processor 330, the memory 340, and the driver 350 will be further described with reference to FIGS. 4 through 12.

Figure 4:
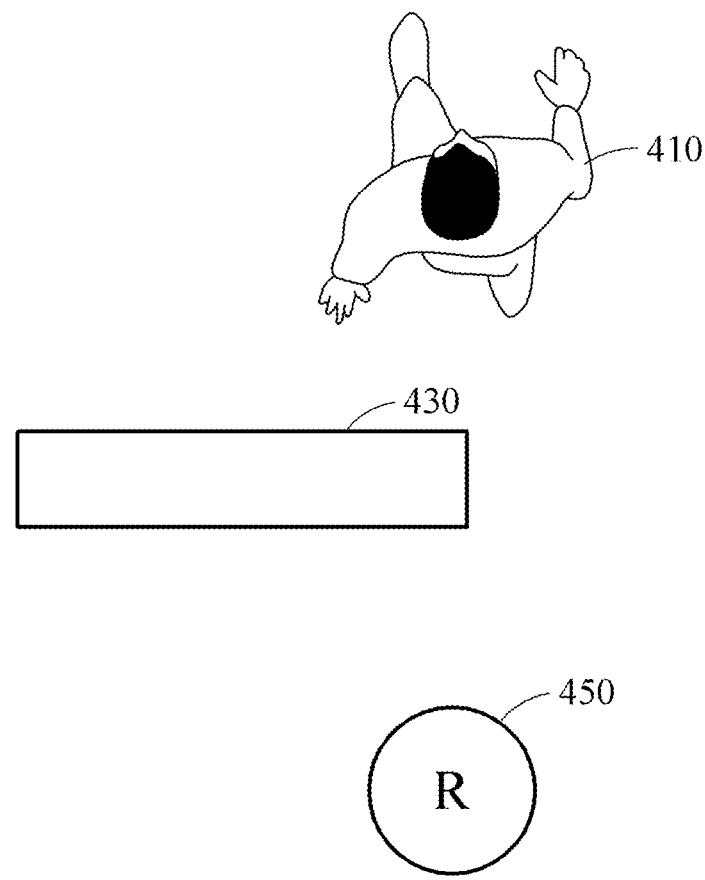
FIG. 4 illustrates a current state according to some example embodiments.

FIG. 4 illustrates a current state of an autonomous driving apparatus 450 according to some example embodiments.

Referring to FIG. 4, an autonomous driving apparatus 450 may correspond to the autonomous driving apparatus 300 of FIG. 3.

The autonomous driving apparatus 450 may travel with a companion 410 while preventing a collision with a nearby obstacle 430. The nearby obstacle 430 may be an object or a person other than the companion 410 present in a particular (or alternatively, predetermined) range in a moving direction of the autonomous driving apparatus 450. The nearby obstacle 430 may be a moving object as well as a stationary object.

Information on ("associated with") a position of the companion 410 (e.g., first information) and information on a position of the nearby obstacle 430 (e.g., second indication) generated based on sensor data received from a sensor of the autonomous driving apparatus may be utilized so that the autonomous driving apparatus 450 travels with the companion 410 and prevents the collision with the nearby obstacle 430.

A current state of the autonomous driving apparatus may be defined based on the information on the position of the companion 410 and the information on the position of the nearby obstacle 430. For example, the current state may indicate a relative position of the autonomous driving apparatus 450 relative to the position of the companion 410 and the position of the nearby obstacle 430.

Figure 5:
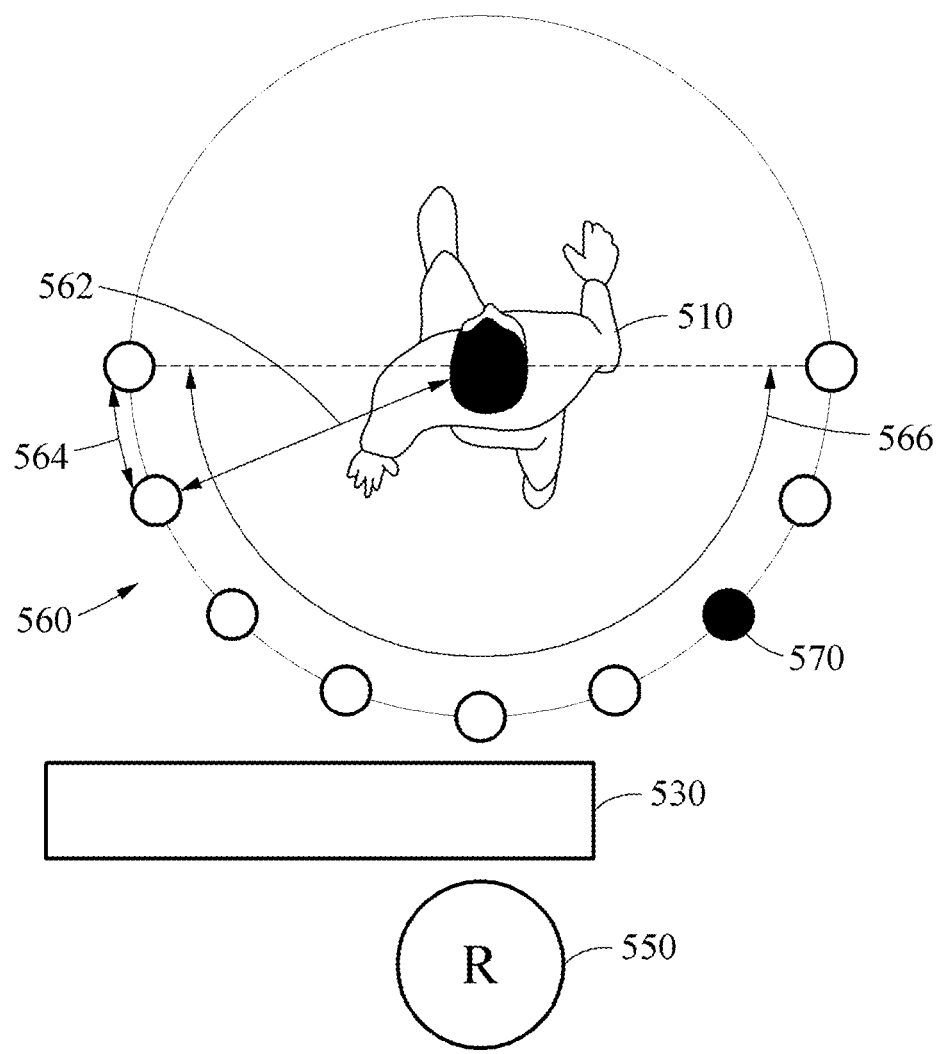
FIG. 5 illustrates a method of determining a tracking point among a plurality of predetermined tracking points around a position of a companion according to some example embodiments.

FIG. 5 illustrates a method of determining a tracking point among a plurality of particular (or alternatively, predetermined) tracking points around a position of a companion according to some example embodiments. The method of FIG. 5 may be implemented by the autonomous driving apparatus 300 illustrated in FIG. 3.

Referring to FIG. 5, an autonomous driving apparatus 550 may determine a tracking point 570 (e.g., first tracking point) among a plurality of tracking points at least partially surrounding a position of a companion 510 in the environment based on a current state of the autonomous driving apparatus 550 that is determined using information on the position of the companion 510 and information on a position of a nearby obstacle 530.

Figure 6:
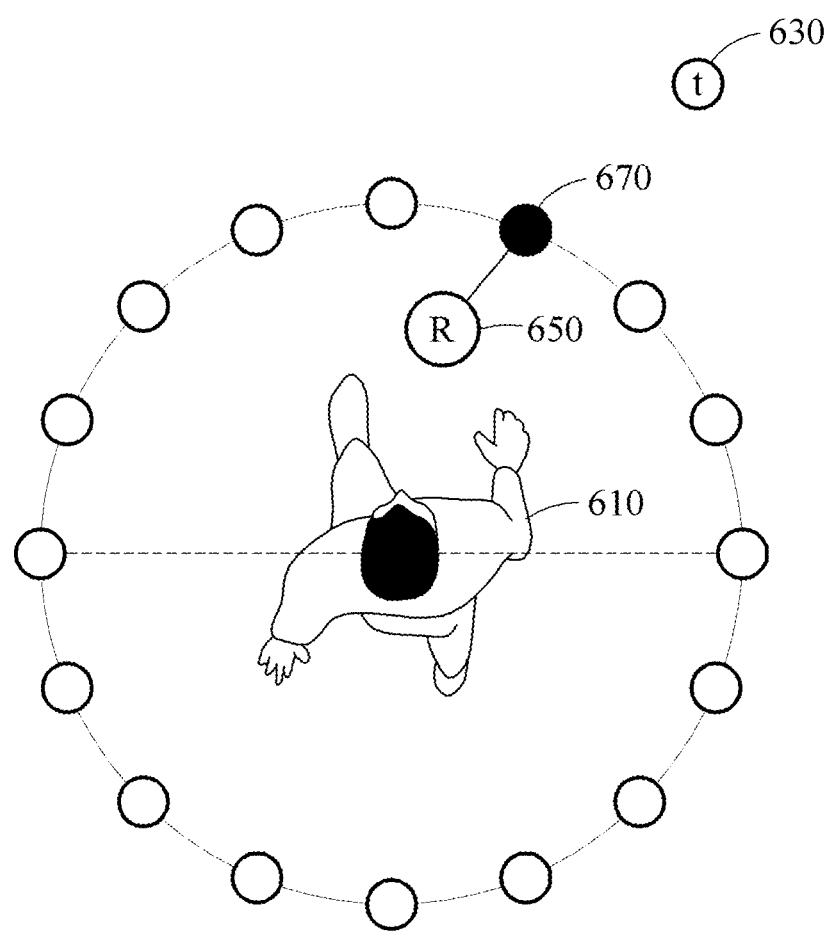
FIG. 6 illustrates an autonomous driving method for destination guide according to some example embodiments.

Positions and a number of the plurality of tracking points 560 around the position of the companion 510 may be determined in advance. A position of each tracking point of the plurality of tracking points 560 in the environment may be defined by the position of the companion 510 in the environment. For example, the plurality of tracking points may be distributed to be equally angularly spaced apart 564 on a circumference of an arc 566 (e.g., a 180-degree arc extending only around a back side of the companion 510 as shown in FIG. 5, a 360-degree arc extending entirely around the companion 510 as shown in FIG. 6, or the like) or a circle having a particular (or alternatively, predetermined) radius (e.g., distance 562) and a center corresponding to (e.g., at) a current position of the companion 510, such that the plurality of tracking points may each be at a fixed distance 562 from the companion 510 at any time. In some example embodiments, the plurality of tracking points may be distributed in a particular (or alternatively, predetermined) area. The plurality of tracking points may be located between the companion 510 and the autonomous driving apparatus 550. The plurality of tracking points may be embodied in various forms and is not limited to the example embodiments set forth herein.

The autonomous driving apparatus 550 may determine a particular (or alternatively, predetermined) point among the plurality of tracking points around the position of the companion 510 to be the first tracking point. Various references may be used to determine the tracking point. In an example, among points to which the autonomous driving apparatus 550 travels with the companion 510 without colliding with the nearby obstacle 530, a point at a shortest distance may be determined to be a tracking point, for example, the tracking point 570.

FIG. 6 illustrates an autonomous driving method for destination guide according to some example embodiments. The method of FIG. 6 may be implemented by the autonomous driving apparatus 300 illustrated in FIG. 3.

Referring to FIG. 6, an autonomous driving apparatus 650 (which may be the autonomous driving apparatus 300) may guide, to a destination 630, a companion 610 who does not know a position of the destination 630. The autonomous driving apparatus 650 may be, for example, a navigation robot. The autonomous driving apparatus 650 for destination guide may guide the companion 610 to the destination 630 ahead of the companion 610 instead of following the companion 610. Even when moving ahead of the companion 610, the autonomous driving apparatus 650 may maintain a particular (or alternatively, predetermined) distance from the companion 610. For example, when the companion 610 stops for a while (e.g., a period of time), the autonomous driving apparatus 650 may also stop. In some example embodiments, the autonomous driving apparatus 650 may move in accordance with a speed of the companion 610.

The current state may be defined further based on information on ("associated with," "indicating," etc.) the position of the destination 630 (e.g., third information"). Since the autonomous driving apparatus 650 travels to the destination 630, the information on the position of the destination 630 may also be taken into consideration in defining the current state. For example, the current state may be a relative position of the autonomous driving apparatus 650 relative to the companion 610, a position of a nearby obstacle (not shown), and the position of the destination 630.

In terms of the autonomous driving method for destination guide, the autonomous driving apparatus 650 may be located between a plurality of tracking positions and the companion 610, where the plurality of tracking positions at least partially surround the companion 610 and are defined by the position of the companion 610 in the environment.

The autonomous driving apparatus 650 may determine a particular (or alternatively, predetermined) point among a plurality of particular (or alternatively, predetermined) tracking points around the companion 610 to be a first tracking point. The first tracking point may be determined using various methods. In an example, among points to which the autonomous driving apparatus 650 travels with the companion 610 while approaching the destination 630, a point at a shortest distance may be determined to be the first tracking point, for example, a tracking point 670.

The first tracking point may be changed based on the current state and a circumstance. For example, when a position of a nearby obstacle is changed or the destination 630 is changed, the first tracking point may be changed. When a typical method of implementing a rule and a travel strategy is used, it may be difficult to create rules for determining a first tracking point in all situations.

The autonomous driving method for accompanied driving may be based on learning performed using an artificial neural network. Thus, a developer may avoid a difficulty of creating rules for determining an appropriate tracking point depending on a situation, and parts ambiguous to be defined by the rules may be learned from a result of an action itself. A method of determining a first tracking point will be described in detail with reference to FIGS. 7 through 10.

Figure 7:
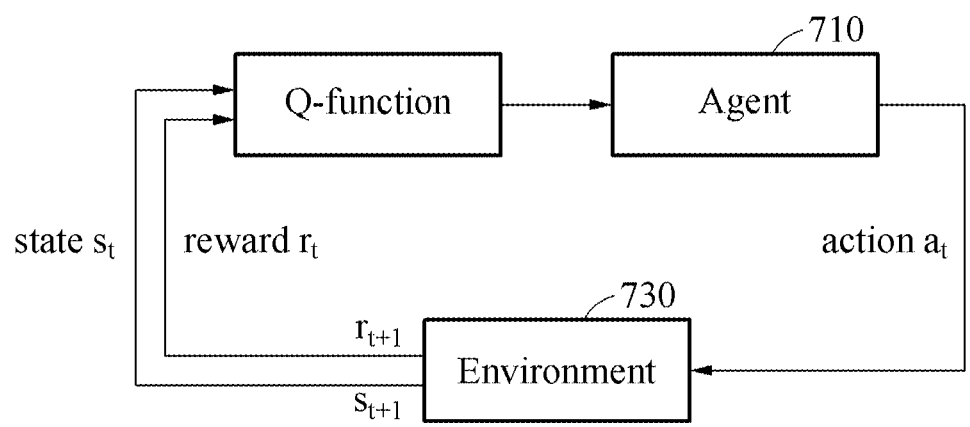
FIG. 7 illustrates a reinforcement learning according to some example embodiments.

FIG. 7 illustrates a reinforcement learning according to some example embodiments. The method of FIG. 5 may be at least partially implemented by the autonomous driving apparatus 300 illustrated in FIG. 3.

Referring to FIG. 7, an autonomous driving method for accompanied driving may be performed using a machine-learning-based neural network, for example, a reinforcement-learning-based neural network.

A reinforcement learning may be an algorithm constituting an environment 730, an agent 710, a state, an action, and a reward. The reinforcement learning relates to a field of machine learning. The reinforcement learning may be a method in which the agent 710 defined in the environment 730 recognizes a current state and selects an action or an action order maximizing a reward from selectable actions. In the reinforcement learning, it is possible to learn an action that maximizes a reward by repeating a sequence of giving a reward for an action. The agent 710 may be an autonomous driving apparatus 300 as described herein. The agent 710 may be an artificial neural network, which may be implemented by the autonomous driving apparatus 300 or a separate computing device, which may include a memory storing a program of instructions and a processor configured to execute the program of instructions to implement the artificial neural network.

The reinforcement learning may include a Q-learning. The Q-learning may be one of reinforcement learning schemes for learning without a model. In the Q-learning, an optimal policy may be learned by learning a Q-function. The Q-function may be a function for predicting an expected value of an efficiency achieved by performing a given action in a given state. The policy may be a rule that indicates which action to be performed in a given state. After learning the Q-function, the optimal policy may be derived by performing an action that gives a largest Q-value in each state. The Q-value may be a function value of the Q-function in each state.

For example, when S={$s_1, \ldots, s_n$} is a set of all possible states in a given system, and when A={$a_1, \ldots, a_n$} is a set of all possible actions in the given system, the agent 710 may take an action "a∈A" in the environment 730 "s∈S". When the agent 710 takes the action "a∈A" in the environment 730 "s∈S", the agent 710 may acquire a reward corresponding thereto. A goal of the agent 710 may be to maximize a sum of reward. The agent 710 may learn which action is the best to be taken in each state. An optimal action in each state may refer to an action taken to acquire a largest reward in a long term in a corresponding state.

Before the algorithm starts, the Q-function may have a fixed value. In each time t, an agent 710 may take an action $a_t$ in a state $s_t$ and shift into a new state $s_{t+i}$. When the agent 710 shifts into the new state $s_{t+1}$, a reward $r_t$ may be acquired and the Q-function may be updated. When the new state $s_{t+1}$ is a termination state, one episode of the algorithm may end. The Q-function may be Equation 1 as shown below.

$$Q(s, a) = r(s, a) + \gamma \max_{a'} Q(s', a') \quad \text{[Equation 1]}$$

In Equation 1, γ may be a discount factor having a value ranging between 0 and 1, and may be a value indicating how much more important a current reward is than a future reward. When the Q-function is sufficiently learned, an optimal policy may be derived by performing an action that gives a largest Q-value in each state. For example, when a Q-function related to the autonomous driving method for accompanied driving is sufficiently learned, the autonomous driving apparatus 300 may perform an action that gives a largest Q-value in each state, thereby determining a tracking point among a plurality of particular (or alternatively, predetermined) tracking points around a position of a companion.

A state and a reward may be defined to perform the autonomous driving method for accompanied driving through the Q-learning. The state may provide criterion information used by the agent 710 to select an action based on a policy. The state may be, for example, a current state. For example, the state may be information (e.g., third information) indicating a relative position of the autonomous driving apparatus 300 relative to a position of a companion and a position of a nearby obstacle in an environment. The reward may be determined based on at least one reward criterion. The reward may be determined by comprehensively considering a first reward criterion for ("associated with") accompanied driving, a second reward criterion for ("associated with") collision avoidance, and a third reward criterion for ("associated with") energy optimization. The A-function may be determined using the reward, so that a tracking point is determined using the determined Q-function.

A unit of the Q-learning may be an episode. Each episode may be associated with movement of an autonomous driving apparatus to a particular tracking point of a plurality of tracking points at least partially surrounding a companion. Separate episodes may be associated with movement to separate tracking points. The agent 710 may repeat an action until one episode ends. An episode termination condition may be defined to perform the autonomous driving method for accompanied driving through the Q-learning. When the autonomous driving apparatus 300 collides with an obstacle, an episode may be terminated. When the autonomous driving apparatus 300 is beyond a particular (or alternatively, predetermined) tracking distance from a pedestrian, an episode may be terminated. When the autonomous driving apparatus 300 maintains a particular (or alternatively, predetermined) tracking distance from a pedestrian over a particular (or alternatively, predetermined) period of time, an episode may be terminated. When terminating an episode, a reward for the episode may be determined. For example, when the autonomous driving apparatus 300 is beyond a particular (or alternatively, predetermined) tracking distance from a pedestrian, the episode may be terminated and a reward for the corresponding action may be reduced. When the autonomous driving apparatus 300 maintains the particular (or alternatively, predetermined) tracking distance from the pedestrian over the particular (or alternatively, predetermined) period of time, the episode may be terminated and a reward for the corresponding action may be increased.

The Q-learning may be performed using various methods. For example, the Q-learning may be performed by updating a Q-table. Since the Q-learning requires various repetitive actions, it is effective to perform the Q-learning using an artificial neural network. A method of performing the Q-learning using the artificial neural network will be described in detail with reference to FIGS. 8 through 10.

Figure 8:
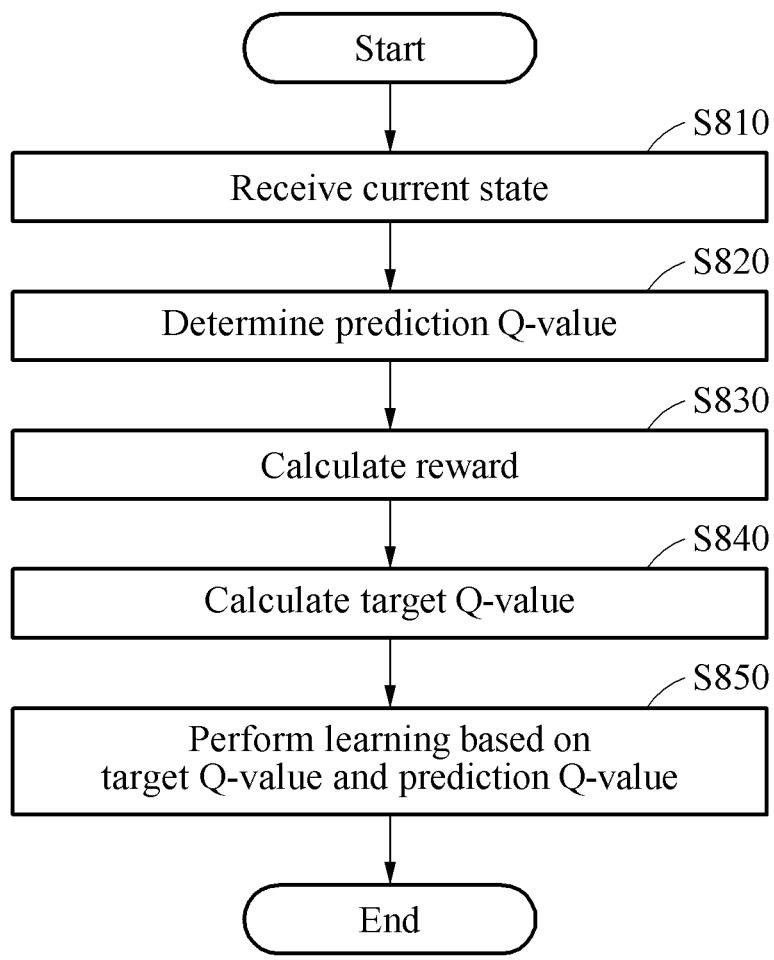
FIG. 8 is a flowchart illustrating an autonomous driving learning method for accompanied driving according to some example embodiments.

FIG. 8 is a flowchart illustrating an autonomous driving learning method for accompanied driving according to some example embodiments. The autonomous driving method of FIG. 8 may be implemented by the autonomous driving apparatus 300 illustrated in FIG. 3.

Referring to FIG. 8, an autonomous driving learning method for accompanied driving may use an artificial neural network. The artificial neural network may include a reinforcement-learning-based neural network, for example, a DQN.

The artificial neural network may output ("generate") a prediction Q-value corresponding to a plurality of tracking points. The artificial neural network may output a prediction Q-value based on processing input information (e.g., fourth information) indicating a current state of the autonomous driving apparatus in an environment, including information indicating a position of a companion in relation to the autonomous driving apparatus and a position of a nearby obstacle in relation to the autonomous driving apparatus in the environment. In some example embodiments, a tracking point of a plurality of tracking points at least partially surrounding the companion in the environment (e.g., a first tracking apparatus) may be determined based on the prediction Q-value; such a tracking point may be referred to as a tracking point corresponding to the predicted Q-value. A Q-value may be predicted using the artificial neural network, and a reward may be calculated based on a new state at the tracking point corresponding to the predicted Q-value. A process of predicting a Q-value and calculating a reward of a new state based on the predicted Q-value may be repeated in an episode associated with a movement of the autonomous driving apparatus to a particular tracking point of the plurality of tracking points. A target Q-value may be determined based on one or more rewards calculated in the episode. The artificial neural network may be learned such that a difference between the target Q-value and the prediction Q-value is minimized.

Operations 5810 through 5850 may be performed by the autonomous driving apparatus 300. The autonomous driving apparatus 300 may be implemented by one or more hardware modules, one or more software modules, or various combinations thereof In operation 5810, the autonomous driving apparatus 300 receives ("third") information indicating a current state of the autonomous driving apparatus based on ("first") information on a position of a companion and ("second") information on a position of a nearby obstacle. The third information may be generated by the autonomous driving apparatus 300 based on processing the first and second information, and the first and second information may be generated by the autonomous driving apparatus 300 based on processing sensor data generated by one or more sensors of the autonomous driving apparatus. A sensor may include an image sensor. The image sensor may be, for example, a camera. The image sensor may be located in the autonomous driving apparatus 300 and may be configured to generate sensor data that, when processed, provides the first information on a position of the companion and the second information on a position of the nearby obstacle. The current state of the autonomous driving apparatus 300 may be a relative position of the autonomous driving apparatus 300 relative to the companion, the position of the nearby obstacle, and a position of the destination, and the third information may indicate such positions and relative positions of the current state. The current state may be a state which is one of elements that constitute the Q-learning described with reference to FIG. 7.

In operation 5820, the autonomous driving apparatus 300 determines a prediction Q-value based on the current state. The autonomous driving apparatus 300 may input the information indicating the current state to the artificial neural network to cause the artificial neural network to generate the prediction Q-value based on the input information indicating the current state, thereby determining a prediction Q-value output based on a weight θ of the artificial neural network. The prediction Q-value may be associated with and/or may indicate a particular tracking point, of a plurality of tracking points at least partially surrounding the position of the companion in the environment, where each tracking point is defined by the position of the companion in the environment.

The weight θ of the artificial neural network may be learned by a target Q-value determined in an episode. In operation S830, the autonomous driving apparatus 300 may calculate ("determined") a reward based on a new state that comes after an action corresponding to a predicted Q-value is performed. The new state may be associated with a new relative position of the autonomous driving apparatus 300 in relation to the companion and the obstacle in the environment as a result of the autonomous driving apparatus being at (e.g., having moved to) a determined tracking point. A particular (or alternatively, predetermined) reward criterion may include a first reward criterion for ("associated with") accompanied driving, a second reward criterion for ("associated with") collision avoidance, a third reward criterion for ("associated with") energy optimization, and a fourth reward criterion related to whether a distance from the autonomous driving apparatus to a destination in the environment decreases as a result of movement to the determined (e.g., particular, "first," etc.) tracking point. The first reward criterion for accompanied driving may be a reward criterion related to a maintenance of a distance between the autonomous driving apparatus 300 and the companion. For example, as a period of time in which the autonomous driving apparatus 300 maintains the distance from the companion increases, the reward may also increase. The second reward criterion for collision avoidance may be a reward criterion related to a maintenance of a distance between the autonomous driving apparatus 300 and an obstacle. For example, when the autonomous driving apparatus 300 collides with the obstacle, a reward may be reduced. The third reward criterion for energy optimization may be a reward criterion related to a travelling efficiency of the autonomous driving apparatus 300. For example, the closer a moving distance of the autonomous driving apparatus 300 is to a shortest distance, the greater the reward. In some example embodiments, the third reward criterion for energy optimization may be a reward criterion related to a rotation speed. For example, the third reward criterion may be Equation 2 as shown below.

$$\text{reward} = \cos(w) - 0.5 \ (w: \text{rotation speed}) \quad \text{[Equation 2]}$$

According to Equation 2, the reward may be reduced when a change in a rotation speed w is relatively large and the reward may be increased when a change in the rotation speed w is relatively small. The fourth reward criterion related to whether a distance from the autonomous driving apparatus to a destination in the environment decreases as a result of movement to the determined (e.g., particular, "first," etc.) tracking point may be a reward criterion related to a distance between the autonomous driving apparatus 300 and the destination. For example, when the destination exists, the reward may be reduced as the distance between the autonomous driving apparatus 300 and the destination increases.

In operation S840, the autonomous driving apparatus 300 calculates ("determines") a target Q-value using the reward calculated in operation S830. The target Q-value may be determined based on a Q-learning algorithm. In operation S850, the artificial neural network of the autonomous driving apparatus 300 may perform learning based on the target Q-value and the prediction Q-value. The artificial neural network may be trained such that the prediction Q-value is approximate to the target Q-value. For example, the weight θ of the artificial neural network may be determined to minimize a difference between the prediction Q-value and the target Q-value.

Figure 9:
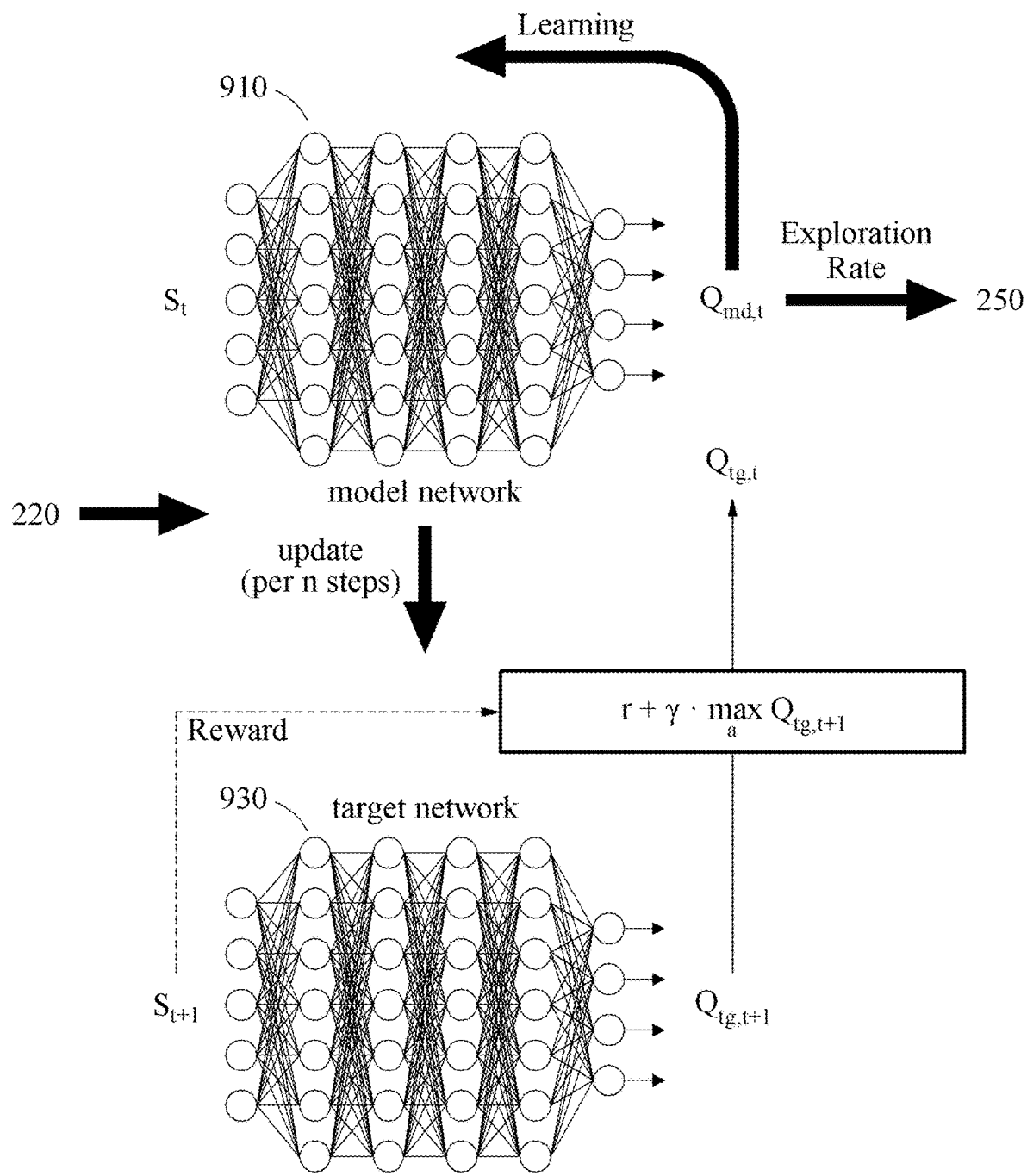
FIG. 9 illustrates an autonomous driving learning method for accompanied driving based on a deep Q-network (DQN) according to some example embodiments.

FIG. 9 illustrates an autonomous driving learning method for accompanied driving based on a DQN according to some example embodiments. The autonomous driving method of FIG. 9 may be implemented by the autonomous driving apparatus 300 illustrated in FIG. 3.

Referring to FIG. 9, a DQN may be updated from a first artificial neural network 910 to a second artificial neural network 930 through a reinforcement learning.

The first artificial neural network 910 may be, for example, an artificial neural network used for predicting a tracking point based of a plurality of tracking points at least partially surrounding a companion in an environment based on a prediction Q-value. The first artificial neural network 910 may be a prediction artificial neural network.

An autonomous driving apparatus may acquire the prediction Q-value by inputting a current state of the autonomous driving apparatus (e.g., information indicating the current state) to the first artificial neural network 910 to cause the first artificial neural network to generate the prediction Q-value based on the input current state (e.g., based on the input information indicating the current state) and move to a tracking point determined based on the prediction Q-value. The autonomous driving apparatus may calculate a reward generated based on a particular (or alternatively, predetermined) reward criterion, based on a surrounding environment of a new position of the autonomous driving apparatus upon the autonomous driving apparatus arriving at the determined tracking point. The particular (or alternatively, predetermined) reward criterion may include a first reward criterion for accompanied driving, a second reward criterion for collision avoidance, a third reward criterion for energy optimization, and a fourth reward criterion related to whether a distance from a distance from the autonomous driving apparatus to a destination in the environment decreases as a result of movement to the determined (e.g., particular, "first," etc.) tracking point.

The autonomous driving apparatus may calculate a target Q-value using the calculated reward. A target Q-value $Q_{tg,t}$ may be obtained using Equation 3 as shown below.

$$Q_{tg,t} = r_t + \gamma \max_{a'} Q(s_{t+1}, a' \mid \bar{\theta}))$$ [Equation 3]

In Equation 3, $\bar{\theta}$ denotes a weight of the second artificial neural network 930. The second artificial neural network 930 may be a target artificial neural network. The target Q-value may be a Q-value matching the particular (or alternatively, predetermined) reward criterion. For example, the target Q-value may be a Q-value related to a tracking point, of the plurality of tracking points at least partially surrounding the companion, at which the autonomous driving apparatus 300 maintains a particular distance from a target (e.g., the companion and/or an obstacle in the environment) with a reduced collision probability and minimizes a rotation.

The autonomous driving apparatus may input the current state (e.g., input information indicating the current state) to the first artificial neural network 910, thereby causing the first artificial neural network 910 to determine (e.g., generate) a prediction Q-value $Q_{md,t}$ which is an output of the first artificial neural network obtained based on a weight $\theta$ of the first artificial neural network. The prediction Q-value $Q_{md,t}$ may be obtained using Equation 4 as shown below.

$$Q_{md,t} = Q(s_t, a_t \mid \theta)$$ [Equation 4]

The first artificial neural network 910 of the autonomous driving apparatus 300 may be trained based on the target Q-value and the prediction Q-value. The first artificial neural network 910 may be trained such that the prediction Q-value is close to the target Q-value. For example, the weight $\theta$ of the first artificial neural network 910 may be determined to minimize a difference between the target Q-value and the prediction Q-value, which may be represented by Equation 5 below.

$$\min_{\theta} \sum_{t=0}^{T} \left[ Q(s_t, a_t \mid \theta) - \left( r_t + \gamma \max_{a'} Q(s_{t+1}, a' \mid \bar{\theta}) \right) \right]^2$$ [Equation 5]

When the weight $\theta$ of the first artificial neural network 910 is learned as shown in Equation 5, the autonomous driving apparatus 300 may determine a tracking point based on the prediction Q-value of ("generated by") the first artificial neural network 910. The determined tracking point may be a tracking point corresponding to an output of a greatest reward among a plurality of particular (or alternatively, predetermined) tracking points. For example, the first artificial neural network 910 may predict a reward for each of a plurality of episodes generated through movement to separate, respective tracking points of a plurality of tracking points at least partially surrounding a companion in an environment, such that each tracking point of the separate, respective tracking points corresponds to a separate reward of a set of rewards, and, the ("first") tracking point to which the autonomous driving apparatus may be caused to move may be selected based on a determination that the tracking point, of the plurality of tracking points, corresponds to a greatest reward of the set of rewards.

While the weight $\theta$ of the first artificial neural network 910 is learned, the weight $\bar{\theta}$ of the second artificial neural network 930 and the target Q-value may not be learned and remain as existing values. The second artificial neural network 930 may be updated at intervals of a particular (or alternatively, predetermined) period. For example, the second artificial neural network 930 may be updated by copying the first artificial neural network 910 at intervals of a particular (or alternatively, predetermined) period.

Figure 10:
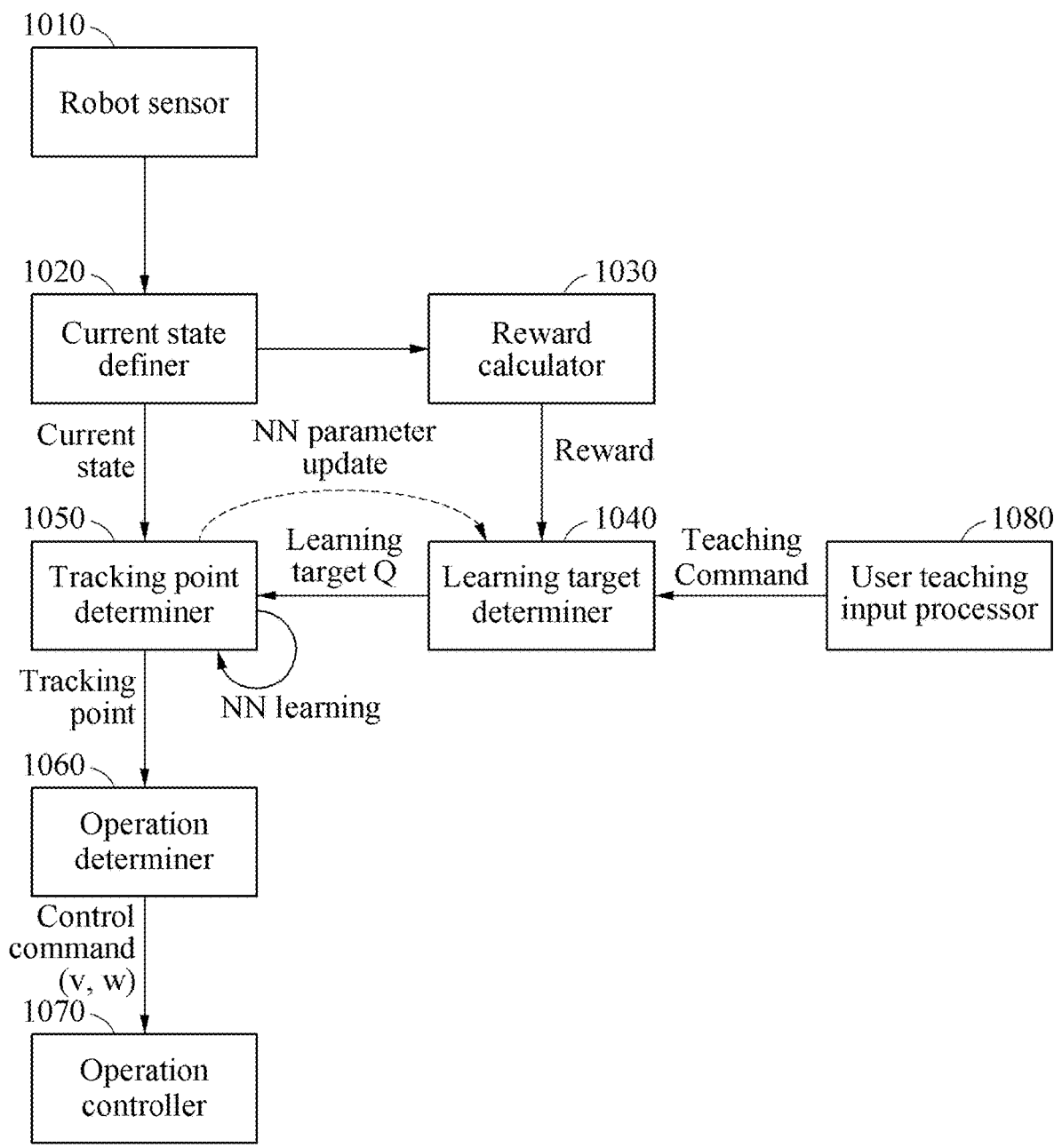
FIG. 10 illustrates an operation based on a function of an autonomous driving apparatus for accompanied driving according to some example embodiments.

FIG. 10 illustrates an operation based on a function of an autonomous driving apparatus for accompanied driving according to some example embodiments. It will be understood that some or all of the elements illustrated in FIG. 10 may be implemented by the autonomous driving apparatus 300 shown in FIG. 3, for example some or all of the elements illustrated in FIG. 10 may be implemented by the processor 330 based on the processor 30 executing one or more programs of instruction stored in the memory 340.

Referring to FIG. 10, an autonomous driving apparatus for accompanied driving may be the autonomous driving apparatus 300 of FIG. 3.

A robot sensor 1010 of the autonomous driving apparatus 300, which may also be sensor 310 of the autonomous driving apparatus 300, may receive information (e.g., "first information") on ("associated with," "indicating," or the like) a position of a companion in an environment and information (e.g., "second information") on a position of a nearby obstacle in the environment from at least one sensor. As referred to herein, receiving information on a position of the companion and/or obstacle may refer to receiving sensor data generated by a sensor, based on the sensor monitoring the environment, and processing the sensor data to generate information indicating the position of the companion and/or obstacle in the environment. The sensor may include an image sensor. The image sensor may be, for example, a camera. The image sensor may be provided in ("included in") the autonomous driving apparatus and may acquire information on a position of a companion and information on a position of a nearby obstacle. Such information may be sensor data generated by the image sensor (e.g., one or more output signals generated by the image sensor), that may be processed (e.g., by processor 330 of the autonomous driving apparatus 300) to generate information indicating the position of the companion and/or nearby obstacle in the environment).

A current state definer 1020 of the autonomous driving apparatus 300 may define a current state of the autonomous driving apparatus based on the information received from the robot sensor 1010. The current state may be information on ("associated with," "indicating," or the like) a relative position between the autonomous driving apparatus and each of the companion and the nearby obstacle.

A reward calculator 1030 of the autonomous driving apparatus 300 may calculate a reward generated based on the current state (e.g., based on third information indicating the current state). For example, the reward determiner 1030 may calculate a reward generated based on a particular (or alternatively, predetermined) reward criterion by inputting the current state (e.g., by inputting the third information indicating the current state) to a second artificial neural network. The reward criterion may include a first reward criterion for accompanied driving, a second reward criterion for collision avoidance, a third reward criterion for energy optimization, and a fourth reward criterion related to whether a distance from a distance from the autonomous driving apparatus to a destination in the environment decreases as a result of movement to the determined (e.g., particular, "first," etc.) tracking point.

A learning target determiner 1040 of the autonomous driving apparatus 300 may calculate a target Q-value in the second artificial neural network using the reward calculated in the reward calculator 1030. The target Q-value may be determined based on a Q-learning algorithm.

A user teaching input processor 1080 of the autonomous driving apparatus 300 may determine the target Q-value based on a teaching command determined by a user in advance. For example, learning to be close to a ground truth may be quickly performed based on the particular target Q-value determined by the user.

The reward calculator 1030, the learning target determiner 1040, and the user teaching input processor 1080 may be used in a learning process and may not be used in a deduction process. In some example embodiments, the autonomous driving apparatus may store parameters of a neural network having completed the reinforcement learning, and may not include the reward calculator 1030, the learning target determiner 1040, and the user teaching input processor 1080.

A tracking point determiner 1050 of the autonomous driving apparatus 300 may include an artificial neural network. An operation determiner 1060 of the autonomous driving apparatus 300 may determine operation information associated with a movement. For example, the operation determiner 1060 may determine a moving speed and/or an angular velocity of the autonomous driving apparatus.

An operation controller 1070 of the autonomous driving apparatus 300 may control an operation of the autonomous vehicle (e.g., to cause the autonomous vehicle to move to a particular tracking point in the environment) based on the determined operation information. For example, the autonomous driving apparatus may move based on the determined tracking point and the operation information using means of mobility equipped therewith (e.g., a driver 350 of the autonomous driving apparatus 300).

Figure 11:
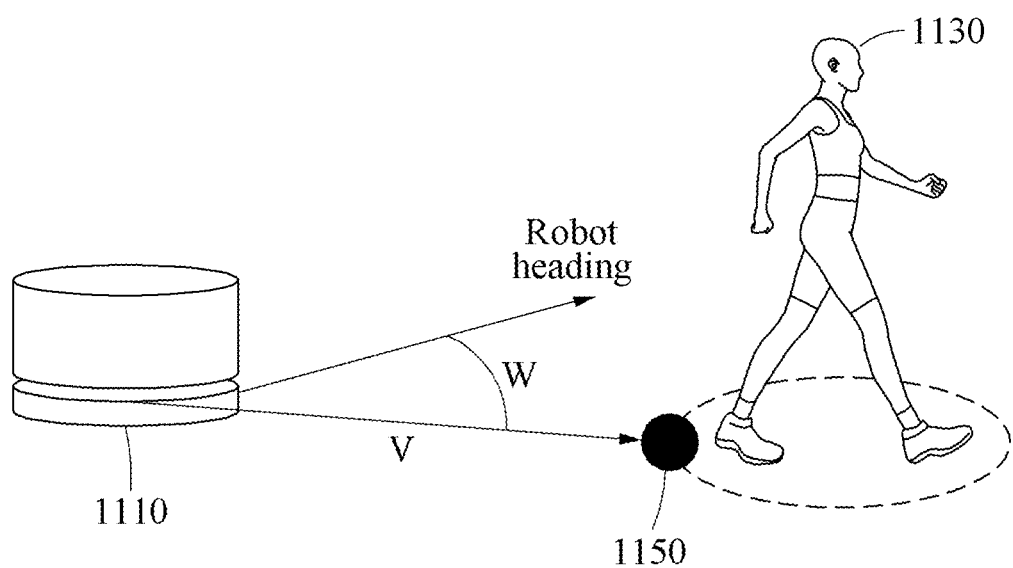
FIG. 11 illustrates an operation method of an autonomous driving apparatus having determined a tracking point according to some example embodiments.

FIG. 11 illustrates an operation method of an autonomous driving apparatus having determined a tracking point according to some example embodiments. The operation method of FIG. 11 may be implemented by the autonomous driving apparatus 300 illustrated in FIG. 3.

Referring to FIG. 11, an autonomous driving apparatus 1110 (which may be the autonomous driving apparatus 300) may determine a tracking point (e.g., a first tracking point) 1150 among a plurality of particular (or alternatively, predetermined) tracking points at least partially surrounding a position of a companion 1130 in the environment, where the companion is a particular designated object in the environment that the autonomous driving apparatus 1110 has designated as a companion to be accompanied and where the tracking points are positions in the environment that are defined by the autonomous driving apparatus 1110 to at least partially surround the companion (e.g., at a fixed distance from the companion and/or at fixed angular spacings around at least a portion of the companion in the environment). When the tracking point 1150 is determined, a processor of the autonomous driving apparatus 1110 (e.g., processor 330) may issue ("generate," "transmit," or the like) a control command to a driver (e.g., driver 350) to cause the autonomous driving apparatus 1110 to move in the environment to reach the tracking point 1150. The control command may include information indicating a particular a moving speed and/or an angular velocity of the autonomous driving apparatus 1110 that is to be achieved by the driver. When the control command is received, the driver may control an operation of the autonomous driving apparatus 1110 to cause the autonomous driving apparatus 1110 to move based on operation information. For example, the autonomous driving apparatus 1110 may move based on the determined tracking point 1150 and operation information using means of mobility equipped therewith (e.g., driver 350). The autonomous driving apparatus 1110 may be embodied in various forms and is not limited to the example embodiments set forth herein.

Figure 12:
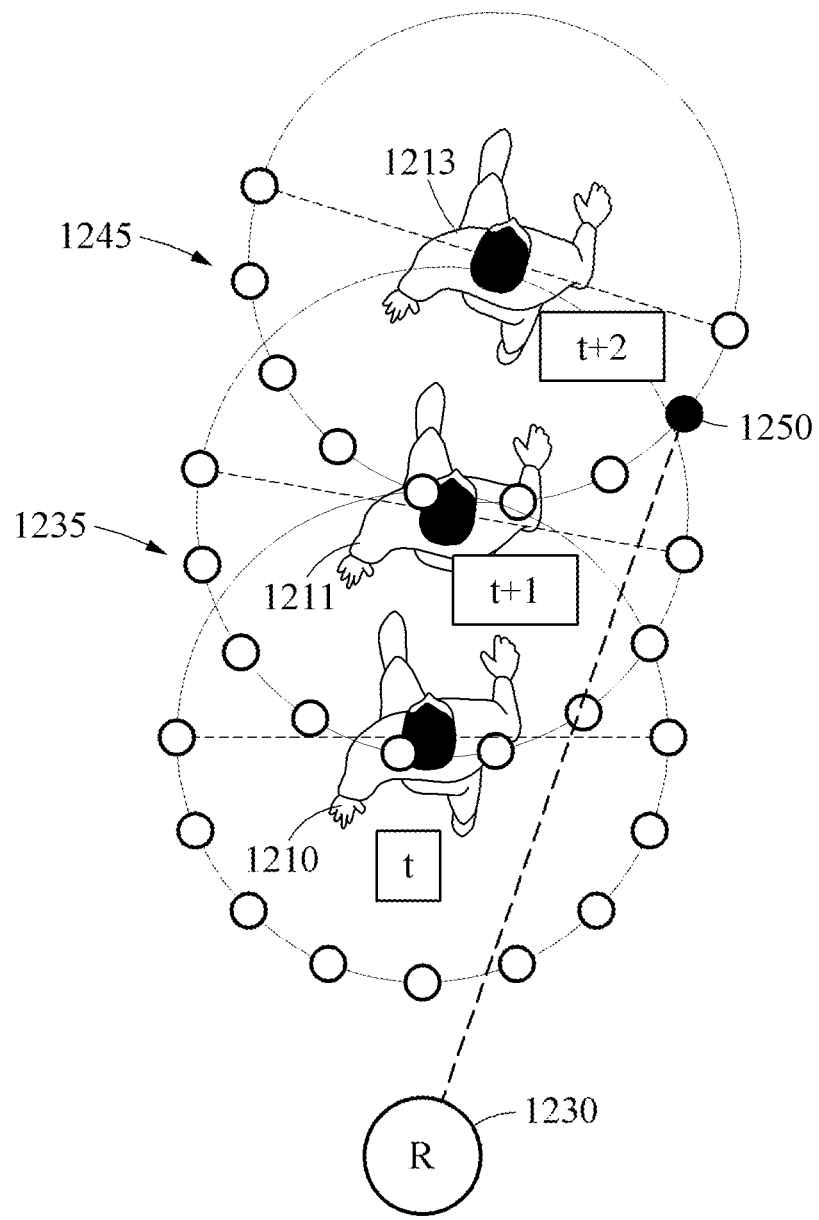
FIG. 12 illustrates an operation method of an autonomous driving apparatus predicting a movement of a companion some example embodiments.

FIG. 12 illustrates an operation method of an autonomous driving apparatus predicting a movement of a companion some example embodiments. The operation method of FIG. 12 may be implemented by the autonomous driving apparatus 300 illustrated in FIG. 3.

Referring to FIG. 12, an autonomous driving apparatus 1230 (which may be autonomous driving apparatus 300) may predict a movement of a companion in the environment and track a position thereof based on the predicted movement. The autonomous driving apparatus 1230 may determine a future tracking point, of a plurality of future tracking points, based on predicting the future movement of the companion in the environment based on positions of candidate tracking points. For example, the autonomous driving apparatus 1230 may determine a future tracking point 1250, of a plurality of future tracking points that are defined by the autonomous driving apparatus 1230 to at least partially surround a future position of companion 1213 in the environment, by predicting a movement of a companion 1213 at a time t+2 based on positions of candidate tracking points of a companion 1210 at a time t and positions of candidate tracking points 1235 of a companion 1211 at a time t+1 to predict a future position of the companion 1213 in the environment, define a plurality of future tracking points 1245 that at least partially surround the predicted future position of the companion 1213 in the environment (e.g., where the future tracking points may have a fixed distance from the predicted future position of the companion 1213 and may be spaced apart evenly accordingly according to a fixed angular spacing around an arc or circle that at least partially surrounds the companion), and select one of the future tracking points as the future tracking point 1250.

Figure 13:
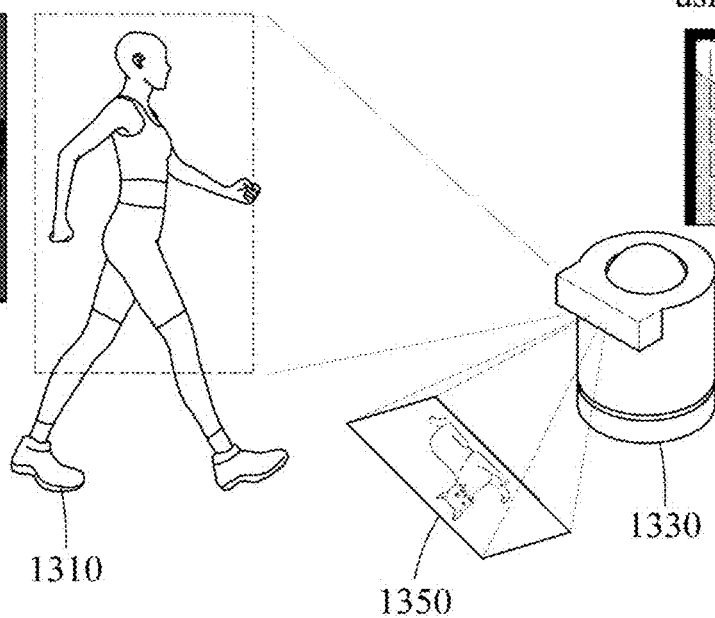
FIG. 13 illustrates an operation method of an autonomous driving apparatus some example embodiments.

FIG. 13 illustrates an operation method of an autonomous driving apparatus some example embodiments. The operation method of FIG. 13 may be implemented by the autonomous driving apparatus 300 illustrated in FIG. 3.

Referring to FIG. 13, an autonomous driving apparatus 1330 (which may be autonomous driving apparatus 300) acquires ("first") information on ("associated with," "indicating," or the like) a position of a companion 1310 in an environment using a sensor of the autonomous driving apparatus (e.g., sensor 310) that is a depth camera (e.g., based on processing sensor data generated by the depth camera). The autonomous driving apparatus 1330 may acquire ("second") information on ("associated with," "indicating," or the like) a position of a nearby obstacle in the environment using a sensor of the autonomous driving apparatus (e.g., sensor 310) that is a laser scanner (e.g., based on processing sensor data generated by the laser scanner). The autonomous driving apparatus 1330 may provide various guide services while tracking the companion. For example, the autonomous driving apparatus 1330 may include a light emitter (e.g., display generator, including a light emitting diode (LED) array configured to emit a particular pattern of light on a surface in the environment, such as a surface upon which one or more of the autonomous driving apparatus 1330 or the companion 1310 are located) configured to provide (e.g., display) an image 1350 on a surface to be viewed by the companion during driving of the autonomous driving apparatus.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. For example, memory 340 may be a non-transitory computer-readable storage device storing computer readable instructions that, when executed by processor 330, cause the processor to perform any of the autonomous driving methods according to any of the example embodiments.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An autonomous driving method for accompanied driving by an autonomous driving apparatus in an environment that includes a companion and an obstacle, the method comprising:
    defining a current state of the autonomous driving apparatus based on first information indicating a position of the companion in the environment and second information indicating a position of the obstacle in the environment, the first information and the second information generated based on processing sensor data generated by at least one sensor of the autonomous driving apparatus that monitors the environment;
    selecting a first tracking point of a plurality of tracking points at least partially surrounding the position of the companion in the environment based on the current state, a position of each tracking point of the plurality of tracking points in the environment defined by the position of the companion in the environment; and
    causing the autonomous driving apparatus to move to the first tracking point to accompany the companion in the environment,
    wherein the selecting the first tracking point includes
        acquiring an output of an artificial neural network corresponding to the plurality of tracking points based on inputting fourth information indicating the current state to the artificial neural network such that the artificial neural network generates the output based on processing the fourth information, and selecting the first tracking point from the plurality of tracking points based on the output of the artificial neural network.

2. The autonomous driving method of claim 1, wherein the defining the current state includes
defining the current state based on third information indicating a position of a destination in the environment.

3. The autonomous driving method of claim 1, wherein the artificial neural network is configured to predict a reward for an episode associated with a movement of the autonomous driving apparatus to a particular tracking point of the plurality of tracking points in a particular state based on
a first reward criterion associated with accompanied driving,
a second reward criterion associated with collision avoidance, and
a third reward criterion associated with energy optimization.

4. The autonomous driving method of claim 3, wherein the artificial neural network is configured to predict the reward further based on a fourth reward criterion associated with a determination of whether a distance of the autonomous driving apparatus from a destination decreases as a result of the movement to the particular tracking point.

5. The autonomous driving method of claim 3, wherein
the artificial neural network is configured to predict a reward for each of a plurality of episodes generated through movement to separate, respective tracking points of the plurality of tracking points, such that each tracking point of the separate, respective tracking points corresponds to a separate reward of a set of rewards, and
the first tracking point is selected based on a determination that the first tracking point corresponds to a greatest reward of the set of rewards.

6. The autonomous driving method of claim 1, wherein the causing the autonomous driving apparatus to move to the first tracking point includes
determining operation information associated with movement of the autonomous driving apparatus to the first tracking point; and
controlling an operation of the autonomous driving apparatus to cause the autonomous driving apparatus to move to the first tracking point based on the determined operation information.

7. The autonomous driving method of claim 6, wherein the determining the operation information includes
determining a speed of the movement; and
determining an angular velocity of the movement.

8. The autonomous driving method of claim 1, wherein the artificial neural network includes a reinforcement-learning-based neural network.

9. The autonomous driving method of claim 1, wherein the selecting the first tracking point includes
determining a future tracking point of a plurality of future tracking points defined by the autonomous driving apparatus to at least partially surround a predicted future position of the companion in the environment based on predicting a movement of the companion.

10. A non-transitory computer-readable storage device storing computer readable instructions that, when executed by processing circuitry, cause the processing circuitry to perform the autonomous driving method of claim 1.

11. An autonomous driving learning method, comprising:
receiving information indicating a current state of an autonomous driving apparatus based on first information indicating a position of a companion in an environment and second information indicating a position of an obstacle in the environment, the first information and the second information generated based on processing sensor data generated by at least one sensor of the autonomous driving apparatus that monitors the environment;
determining a prediction Q-value based on inputting the information indicating the current state to an artificial neural network to cause the artificial neural network to generate the prediction Q-value based on the input information indicating the current state;
determining a tracking point of a plurality of tracking points at least partially surrounding the position of the companion in the environment based on the prediction Q-value, a position of each tracking point of the plurality of tracking points in the environment defined by the position of the companion in the environment;
calculating a reward based on a new state of the autonomous driving apparatus at the determined tracking point, the new state associated with a new relative position of the autonomous driving apparatus in relation to the companion and the obstacle when the autonomous driving apparatus is at the determined tracking point;
determining a target Q-value based on the reward; and
training the artificial neural network based on the target Q-value and the prediction Q-value.

12. The autonomous driving learning method of claim 11, wherein the reward is determined based on
a first reward criterion associated with accompanied driving,
a second reward criterion associated with collision avoidance, and
a third reward criterion associated with energy optimization.

13. The autonomous driving learning method of claim 11, further comprising:
repetitively determining the new state and the reward in a particular episode associated with a movement of the autonomous driving apparatus to a particular tracking point of the plurality of tracking points.

14. The autonomous driving learning method of claim 11, wherein the determining the target Q-value includes
determining, by a user, a particular target Q-value.

15. An autonomous driving apparatus configured to perform accompanied driving in an environment that includes a companion and an obstacle, the autonomous driving apparatus comprising:
a sensor configured to generate sensor data based on monitoring the environment;
processing circuitry configured to
define a current state of the autonomous driving apparatus based on processing the sensor data to determine a position of the companion in the environment and a position of the obstacle in the environment, and
select a first tracking point of a plurality of tracking points at least partially surrounding the position of the companion in the environment based on the current state, a position of each tracking point of the plurality of tracking points in the environment defined by the position of the companion in the environment; and
a driver configured to move the autonomous driving apparatus to the first tracking point to cause the autonomous driving apparatus to accompany the companion in the environment, wherein the processing circuitry is configured to
acquire an output of an artificial neural network corresponding to the plurality of tracking points based on inputting fourth information indicating the current state to the artificial neural network such that the artificial neural network generates the output based on processing the fourth information, and
select the first tracking point from the plurality of tracking points based on the output of the artificial neural network.

16. The autonomous driving apparatus of claim 15, wherein the processing circuitry is configured to define the current state further based on information indicating a position of a destination in the environment.

17. The autonomous driving apparatus of claim 15, wherein the artificial neural network is configured to predict a reward for an episode associated with a movement of the autonomous driving apparatus to a particular tracking point of the plurality of tracking points in a particular state based on
a first reward criterion associated with accompanied driving,
a second reward criterion associated with collision avoidance, and
a third reward criterion associated with energy optimization.

18. The autonomous driving apparatus of claim 17, wherein the artificial neural network is configured to predict the reward further based on a fourth reward criterion associated with a determination of whether a distance of the autonomous driving apparatus from a destination decreases as a result of the movement to the particular tracking point.

19. An autonomous vehicle configured to perform accompanied driving in an environment that includes a companion, the autonomous vehicle comprising:
a sensor configured to generate sensor data based on monitoring the environment;
processing circuitry configured to
define a relative position of the autonomous vehicle based on processing the sensor data to determine a position of the companion in the environment, and
select a first tracking point of a plurality of tracking points at least partially surrounding the position of the companion in the environment based on the relative position, a position of each tracking point of the plurality of tracking points in the environment defined by the position of the companion in the environment; and
a driver configured to move the autonomous vehicle to the first tracking point to cause the autonomous vehicle to accompany the companion in the environment,
wherein the processing circuitry is configured to
acquire an output of an artificial neural network corresponding to the plurality of tracking points based on inputting fourth information indicating the relative position to the artificial neural network such that the artificial neural network generates the output based on processing the fourth information, and
select the first tracking point from the plurality of tracking points based on the output of the artificial neural network.

20. The autonomous vehicle of claim 19, wherein
the environment further includes an obstacle that is separate from the companion, and
the processing circuitry is further configured to define the relative position of the autonomous vehicle based on processing the sensor data to determine a position of the obstacle in the environment.

21. The autonomous vehicle of claim 19, wherein the processing circuitry is configured to define the relative position further based on information indicating a position of a destination in the environment.

22. The autonomous vehicle of claim 19, wherein the artificial neural network is configured to predict a reward for an episode associated with a movement of the autonomous vehicle to a particular tracking point of the plurality of tracking points in a particular state based on
a first reward criterion associated with accompanied driving,
a second reward criterion associated with collision avoidance, and
a third reward criterion associated with energy optimization.

23. The autonomous vehicle of claim 22, wherein the artificial neural network is configured to predict the reward further based on a fourth reward criterion associated with a determination of whether a distance of the autonomous vehicle from a destination decreases as a result of the movement to the particular tracking point.

* * * * *